United States Patent [19]
Harmon et al.

[11] 3,862,585
[45] Jan. 28, 1975

[54] METHOD OF MANUFACTURING TAPERED INVOLUTE SPLINES

[75] Inventors: Kenneth B. Harmon, Indianapolis; George L. Bowers, Mooresville; William G. Livezey, Indianapolis, all of Ind.

[73] Assignee: General Motors Corporation, Detroit, Mich.

[22] Filed: Dec. 18, 1972

[21] Appl. No.: 315,805

Related U.S. Application Data

[62] Division of Ser. No. 157,195, June 28, 1971, abandoned.

[52] U.S. Cl. ................................ 90/2, 90/4, 90/7
[51] Int. Cl. ........................... B23f 5/16, B23f 5/20
[58] Field of Search ........................ 90/2, 4, 7, 6, 8

[56] References Cited
UNITED STATES PATENTS
2,315,068  3/1943  Matthews............................ 90/4 X
3,399,599  9/1968  Looman et al...................... 90/7 X

*Primary Examiner*—Andrew R. Juhasz
*Assistant Examiner*—Z. R. Bilinsky
*Attorney, Agent, or Firm*—John P. Moran

[57] ABSTRACT

A tapered involute spline arrangement, and a method of manufacturing same, wherein the internal teeth on the hub are generated on a standard gear shaper having the generating head thereof tilted and secured to the bed or base at an angle conforming to the internal taper on the hub, and the external teeth on the tapered portion of the shaft are hobbed on a standard crown-type hobbing machine having a cam template with the cam follower surface thereof formed in a nonlinear shape such that the arc tooth thickness of the teeth generated on the shaft are caused to be equal to the arc tooth spaces between the teeth of the hub at all increments of axial length of the spline connection, resulting in full-length contact and no backlash between the hub and the shaft.

3 Claims, 10 Drawing Figures

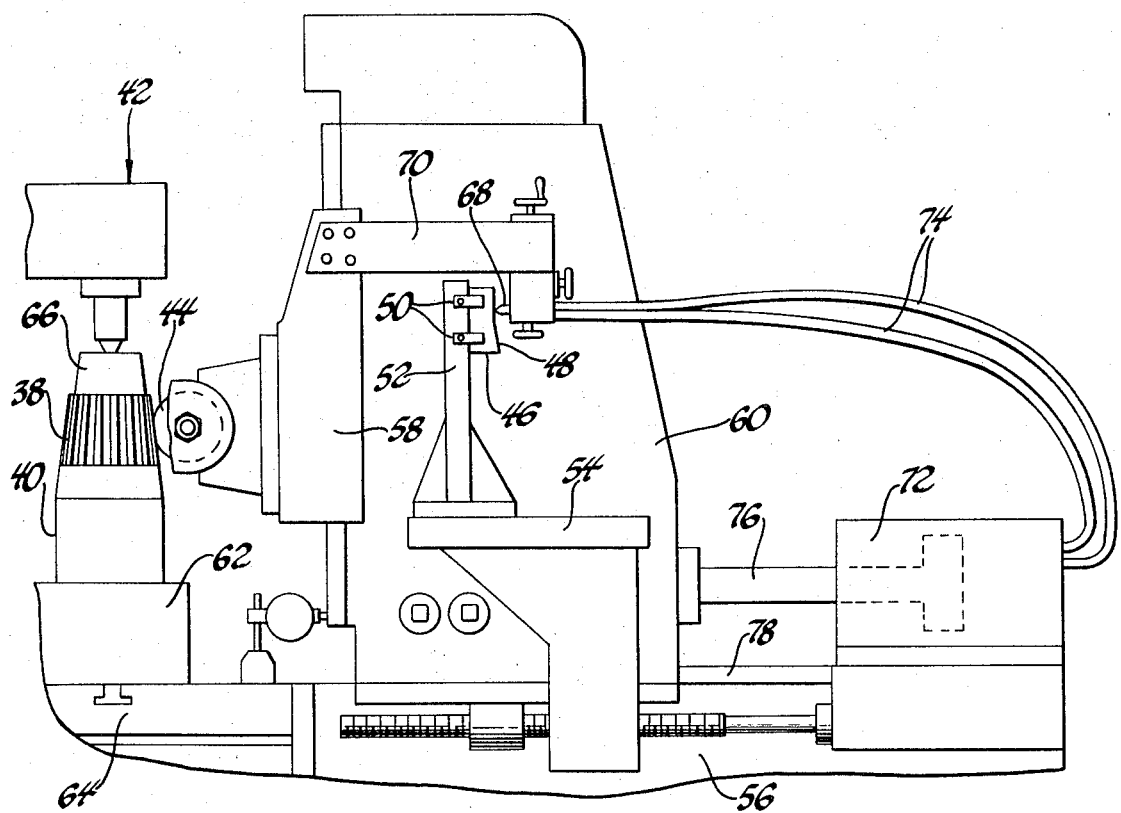
Fig. 6
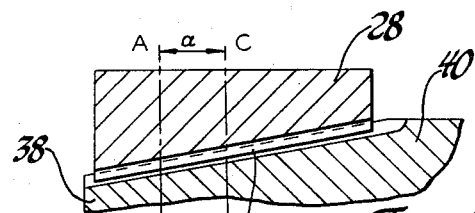
Fig. 8
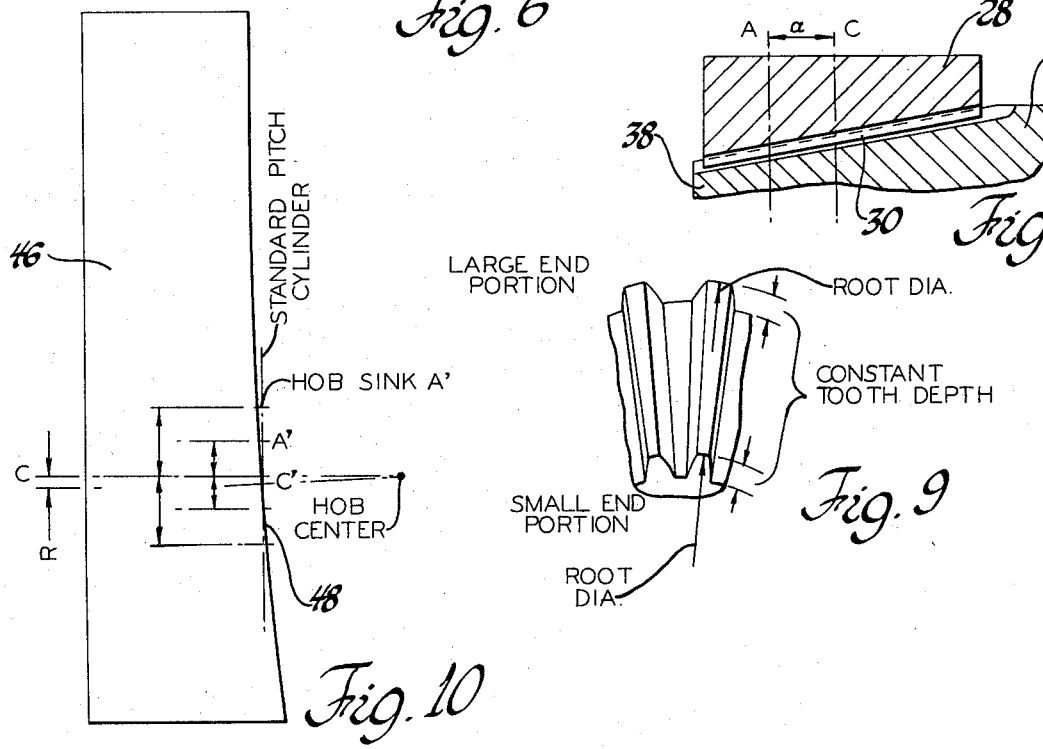
Fig. 9
Fig. 10

METHOD OF MANUFACTURING TAPERED INVOLUTE SPLINES

This is a division of application Ser. No. 157,195, filed June 28, 1971 and now abandoned.

This invention relates generally to gear forming machine tools and, more particularly, to a method of forming matching interconnecting tapered involute splines, i.e., male and female members having oppositely extending longitudinally tapered interconnecting surfaces, wherein such surfaces are of an involute shape, such involute shape being defined as a portion of the curve which would be generated by a point on a perfectly flexible inextensible member, such as a string, for example, as the latter is unwound from the outer surface of a spool or cylinder.

Tapered splines are conventionally employed to connect two members for the transmittal of power. Heretofore such splines have normally been manufactured as straight-sided splines via single-form tooling, for example, broaching the teeth in the hub and hobbing the teeth onto the shaft, with the members then assembled by means of a heavy swage. Such a process is costly and time-consuming and may require special fabricating equipment, and often producing only spot contact within the spline.

Accordingly, a primary object of the invention is to provide means for producing tapered involute splines which provide full-length, full-tooth contact between an assembled tapered hub and shaft or axle.

Another object of the invention is to produce matching tapered involute splines on standard gear hobbers and shapers.

A further object of the invention is to generate the internal tapered hub teeth on a standard gear shaper having the generating head tilted and secured at an angle equal to one-half of the desired included taper angle.

A still further object of the invention is to hob the external tapered shaft or axle teeth on a standard crown-type hobbing machine having a cam template contoured in a predetermined nonlinear shape such that the arc tooth thickness of the teeth generated on the shaft are calculated to be equal to the arc tooth space of the hub at all selected points along the axial length.

These and other objects and advantages of the invention will be apparent when reference is made to the following description and accompanying drawings, wherein:

FIG. 6 is a front view of a standard crown-type hobbing machine modified in accordance with the invention;

FIG. 8 is a fragmentary schematic illustration of a hub and shaft produced in accordance with the invention;

FIG. 9 is a schematic illustration of a characteristic of the invention; and

FIG. 10 is an enlarged view of a portion of the FIG. 6 structure.

Figure 1:
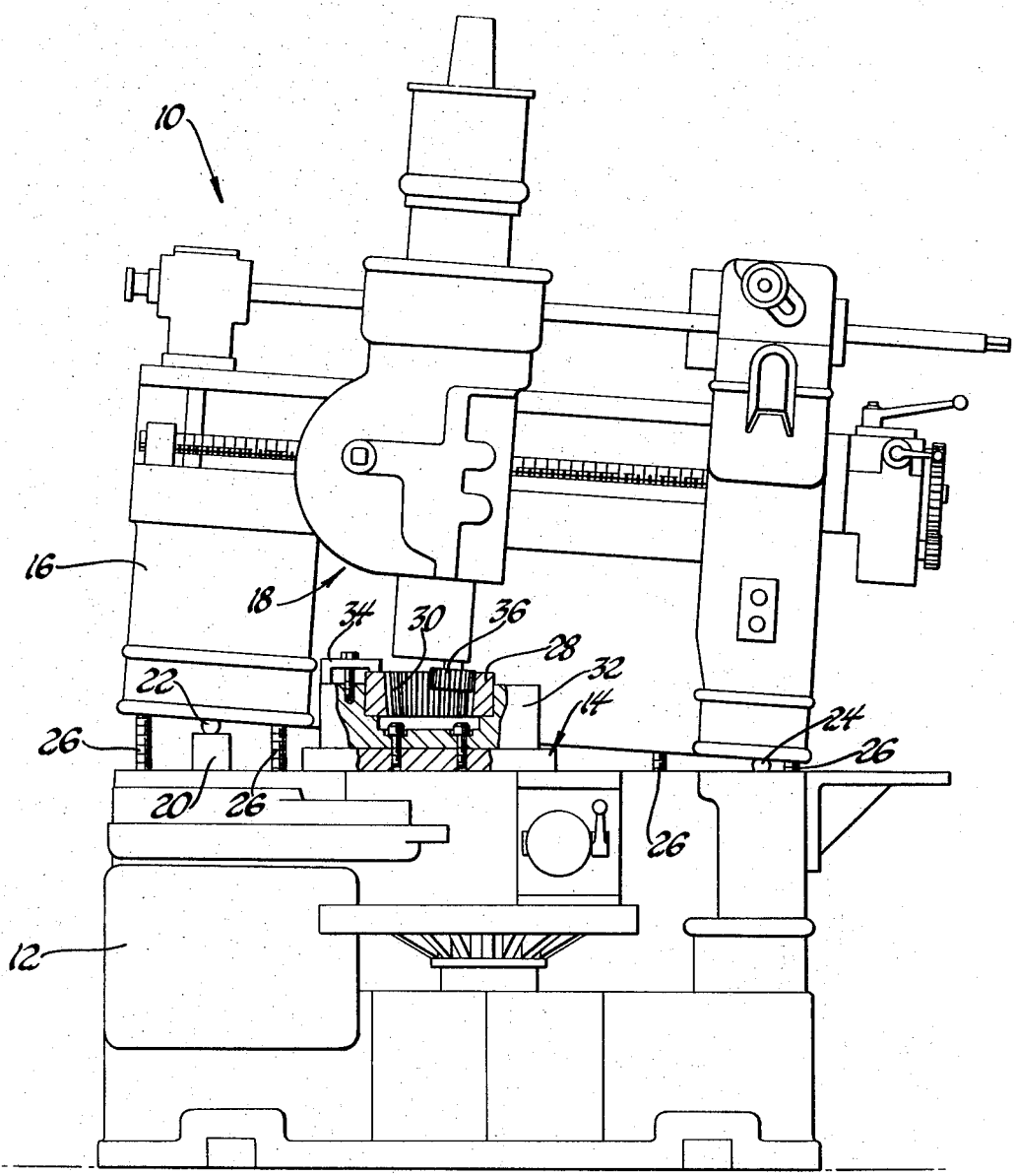
FIG. 1 is a front view of a standard gear shaper modified in accordance with the invention.

Referring now to the drawings in greater detail, FIG. 1 illustrates a standard gear shaper, for example, a 6–A type Fellows Gear Shaper 10, manufactured by The Fellows Gear Shaper Company, Springfield, Ver., including the usual bed or basee portion 12 having a work support table 14 mounted thereon, and a head portion 16 having a cutter slide and spindle assembly 18 mounted thereon. With the head portion 16 raised, a spacer member 20 of a predetermined thickness is positioned on the base support 12, while support rod members 22 and 24 are placed between the spacer 20 and the head portion 16, and between the base portion 12 and the head portion 16, respectively, the head portion 16 being located directly above its conventional position on the base portion 12 and secured to the base portion 12 in its new elevated position by conventional means, such as bolts 26.

A hub blank or workpiece 28, including an internally formed taper 30 is secured in a holding fixture 32 mounted on the work support 14 and secured therein by clamps 34. A conventional cutter 36 is mounted on the cutter slide and spindle 18 and aligned with a side of the internal taper 30 of the hub blank 28 in the usual manner. At this point, it should be noted that the overall height of the spacer member 20 is such that the angle of tilt of the head portion 16 relative to the horizontal base portion 12 is equal to one-half of the included taper angle of the internally formed taper of the workpiece 28.

In operation, the rotating cutter 36 is lowered along the axis of the cutter slide and spindle 18, forming teeth on the inner tapered surface 30 of the workpiece 28 at a constant depth along the full height of the secured workpiece 28, the workpiece 28 being rotated by the work support table 14 in a timed relationship with the rotation of the cutter 36. At the conclusion of the full-length pass, the table 14 is automatically retracted a predetermined amount to free the workpiece 28 from the cutter 36 from the hub 28 for the vertical retraction of the cutter 36 by the cutter slide and spindle 18.

Figure 3:
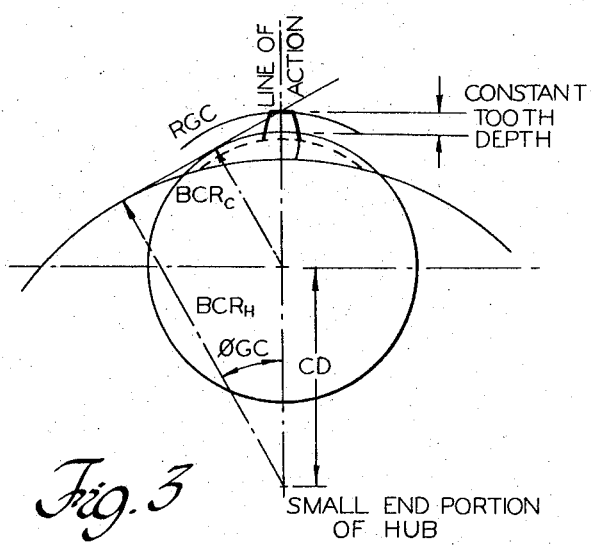
FIGS. 3 and 4 are schematic illustrations of characteristics of the invention.
Figure 4:
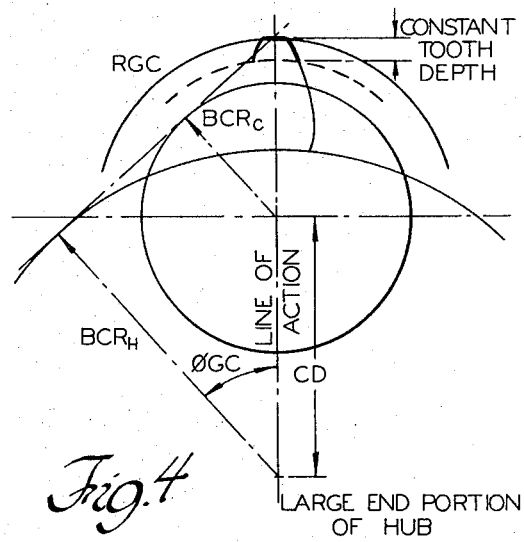

Referring now to FIGS. 3 and 4, it may be noted that the generating radius RGC of the cutter 36, in relation to the workpiece 28, which is established by the intersection of the line of centers and the line tangent to the base circles of the hub blank 28 and the cutter 36, increases proportionally to the center distance increase. The center distance change with axial length of the spline is a function of the degree of taper or tilt of the gear shaper machine head 16 relative to the axis of the hub 28.

Figure 2:
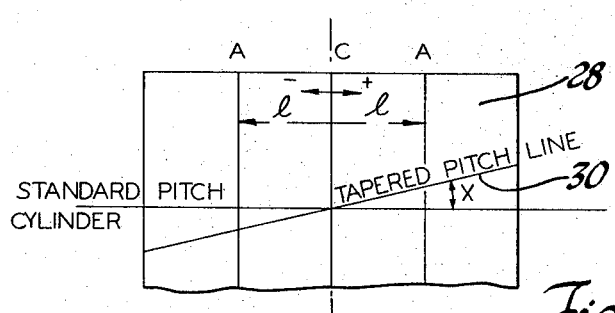
FIG. 2 is a fragmentary view of a portion of FIG. 1.

The procedure for determining the arc space width of the tapered spline at any axial point along the spline is as follows:

1. Establish as the axial location of the reference position C (FIG. 2), the plane midway between the ends of the taper, where the tapered spline corresponds to a standard cylindrical spline, i.e., the point at which the pitch diameter on the pitch cone of the tapered spline is equal to the standard diameter of a straight cylindrical spline.

2. Determine the center distance, CD, (FIGS. 3 and 4) between the cutter and the axis of the hub for a new axial position A, some length L, say, +0.5 inch, away from the reference position C.

$CD_A = CD_{STD} + l \tan\alpha$ where $CD_A$ = center distance at some axial position A $CD_{STD}$ = standard center distance or
[(No. teeth on hub − No. teeth on cutter,)/(2× $DP$)]
where
  $DP$ = diametral pitch or the number of teeth/inch of pitch circle diameter, i.e., (16/1) or (56/3.5).
Substituting,
  [(56 − 16)/(2 × 16)] + 1.25,
  l = length from the plane of the standard conditions to position A, say, +0.5 inch, (+ toward large end from C and − toward small end);
  α = angle of shaper head tilt resulting from the insertion of spacer member 20, say, 4°.
Substituting,
  $CD_A$ = 1.25 × 0.5(0.06992681), or
  $CD_A$ = 1.28496340.

3. Determine the generating radius (FIGS. 2 and 3) of the cutter for the axial position A, the generating radius being that radius at which a space width is generated in the hub equal to the tooth thickness on the cutter.
  $RGC = [(CD_A \times BCR_C)/(BCR_H - BCR_C)]$
where
  $RGC$ = cutter generating radius;
  $BCR_C$ = cutter base circle radius, or (No. teeth on cutter/2$DP$) × cosine of the pressure angle, PA (selected to be 30°);
  $BCR_H$ = hub base circle radius, or (No. teeth on hub/2$DP$) × cosine PA.
Substituting,
  $RGC$ = [(1.28496340 × (16/2.16) × cos 30°)/(56/2.16 × cos 30° − 16/2.16 × cos 30°)]
  $RGC$ = 0.51398528

4. Determine the arc tooth thickness at the cutter generating radius. (See MANUAL OF GEAR DESIGN by Earle Buckingham, Section Two, page 37.)
  $ATT_{RGC} = 2\ RGC\ [(ATT_{SC}/2R_{SC}) + {}_{Inv}\ \phi_{SC} - \text{Inv}\ \phi_{GC}]$
where
  $ATT_{RGC}$ = arc tooth thickness at $RGC$;
  $SC$ = standard condition;
  $GC$ = generating condition;
  $2R_{SC}$ = cutter pitch circle diameter, which equals 1 inch for the example being calculated;
  $ATT_{SC}$ = arc tooth thickness on cutter at known diameter of $2R_{SC}$. (This data may be determined as a result of measuring the size of the cutter over oppositely disposed pins positioned between adjacent teeth in the conventional manner and is equal to π/16·2 + 0.09817477 for the example being calculated.)
  Inv $\phi_{SC}$ = involute of the pressure angle, 30°, at $R_{SC}$, the value being obtainable from tables as 0.05375149. (See MANUAL OF GEAR DESIGN by Earle Buckingham, Section One, page 115.)
  Inv $\phi_{GC}$ + involute of the pressure angle at RGC, $\phi_{GC}$, (FIGS. 3 and 4)
where
  cos $\phi_{GC}$ = [($R_{SC}$/$RGC$)· cos $\phi_{SC}$], the standard pressure angle $\phi_{SC}$ being 30° for the example being calculated. (See above referenced MANUAL OF GEAR DESIGN, Section Two, Page 37.)
Specifically,
  cos $\phi_{GC}$ = [(0.500/0.51398528) × 0.8660254] or 0.84246128
  ∴ $\phi_{GC}$ = 32.59905552 and the value of Inv $\phi_{GC}$ is obtainable from tables as 0.07054260. (See above referenced MANUAL OF GEAR DESIGN, Section One, page 116.)
Substituting,
  $ATT_{RGC}$ = 2× 0.51398528[(0.09817477/1) + 0.5375149 − 0.07054260] = 0.08365999.
Therefore,
  $ASW_{RGH}$ = 0.08365999
where
  $ASW_{RGH}$ = the arc space width on the hub at the generated radius on the hub of RGH
and
  $RGH = CD_A + RGC$ = 1.28496340 + 0.51398528 = 1.79894868.

5. Determine the arc space width $ASW_{ARSH}$ at the axial position A and at the standard pitch radius.
  $ASW_{ARSH} = 2R_{SH}[(ASW_{RGH}/2(RGH)) + \text{Inv}\ \phi_{GC} - \text{Inv}\ \phi_{SC}]$
where
  $2R_{SH}$ = standard pitch cylinder diameter, or (No. teeth on hub/DP) = (56/16) = 3.50
Substituting,
  $ASW_{ARSH}$ = 2 × 1.750[(0.08365999/2 × 1.79894868) + 0.07054260 − 0.05375149]
  = 0.14015253.

Figure 5:
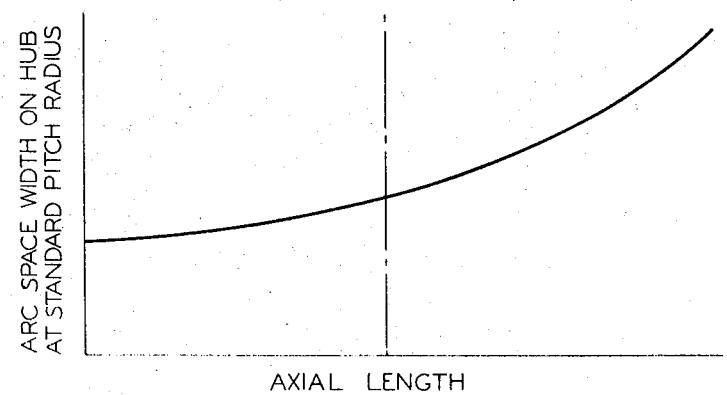
FIG. 5 is a graph illustrating a characteristic of the invention.

When a number of different positions along the axial length of the tapered spline surface 30 have been calculated via the foregoing procedure and the points representing same plotted, the resultant curve of arc space width of the hub 28 versus the axial length of the spline is a nonlinear curve, represented generally in FIG. 5.

In order for the teeth on the tapered end portion 38 (FIGS. 5, 6 and 8) of a cooperating shaft or axle 40 to have full-length contact with the walls of the tapered spline formed in the hub 28, such external teeth must be generated on the shaft 40 so as to have a thickness to match the above-described arc space width of the hub 28, the curve of FIG. 5 thus describing the thickness on the shaft, as well. The machining of the teeth of the shaft 40 is accomplished by using a standard crown-type hobbing machine 42, (FIG. 6), for example, a Gould & Eberhardt G–8A Gear Hobber, manufactured by Gould & Eberhardt, Inc., Irvington, N.J., incorporating a standard rotatable hob 44 and a cam template 46 having a specially shaped cam surface 48 formed thereon. The template 46 is secured by clamps 50 to a fixture 52 mounted on a table member 54 which is secured to the base 56 of the hobbing machine 42. The hob 44 is rotatably mounted on a slide assembly 58 which may feed either upwardly or downwardly on a stanchion 60.

The shaft 40 is mounted with its axis vertical between a suitable jig or holding fixture 62 on a rotatable table 64 mounted on the base 56 and a fixed slidably mounted centering pin 66. The required tooth thickness on the tapered end 38 is obtained by varying the hob-to-shaft center distance at a predetermined rate as the hob 44 traverses from the small end portion downwardly to the large end portion of the tapered end 38 of the shaft 40. The progressively varying hob-to-shaft center distance, substantially corresponding to the respective cutter-to-hub center distances, is controlled throughout the axial travel of the rotating hob 44 by means of the cam template 46 having the predetermined cam surface 48 formed thereon.

The surface 48 is contacted and followed by a tracer stylus 68 which is secured for vertical movement with the slide assembly 58 by means of an interconnecting support arm 70. The resultant lateral movement of the stylus 68 actuates a hydraulic cylinder 72 by metering oil thereto via lines 74 in response to such lateral movement. The extended piston rod 76 of the cylinder 72, in turn, is connected to the stanchion 60 of the hobbing machine 42 to correspondingly slidably move the stanchion 60 along the ways 78 of the base 56, thus imparting horizontal motion to the simultaneously rotating hob 44 in accordance with the shape of the cam surface 48.

The cam surface 48 (FIG. 7) of the cam template 46 is formed so as to control the center distance between the hob 44 and the shaft 40, as the hob 44 traverses the length of the tapered end portion 38, in a manner such that the resultant arc tooth thickness conforms to the curve of FIG. 5. This is accomplished in the following manner:

At each axial point along the spline at which the arc space width ($ASW_{ARSH}$) has been previously calculated, corresponding values of Hob-Sink$_A$ must now be determined. The formula for determining these values of Hob-Sink$_A$ is:

Hob-Sink$_A$ = $[(ASW_{CRSH} - ASW_{ARSH})/(2 \times \tan \phi_{SC})]$ where $ASW_{CRSH}$ = the arc space width on the hub at the reference position C and at the standard pitch radius (generally established as one-half circular pitch). This value for the example under consideration is 0.09817477 (same as $ATT_{SC}$ above).

$ASW_{ARSH}$ = the arc space width on the hub at the axial position A and at the standard pitch radius. This value for the example under consideration is 0.14015253, as calculated above.

Tan $\phi_{SC}$ = tangent of the standard pressure angle (30° for the example). The value for the example is 0.57735027.

Substituting the values above (for this example of a particular location A where 1 = + 0.5 inch):

Hob-Sink$_A$ = $[(0.09817477 - 0.14015253)/(2 \times 0.57735027)]$
= $- 0.03633189$ A negative value of Hob-Sink means that the center distance between the hob and the shaft must be increased; a positive value of Hob-Sink means a decrease in center distance (from the standard distance) between the hob and shaft.

If the Hob-Sink$_A$ is determined for other locations of A, then a graph of Hob-Sink$_A$ versus l (defining the axial position on the spline) can be constructed. Additional values of Hob-Sink$_A$ for various values of l have been tabulated as follows for this example and shown generally in FIG. 7:

| l | Hob-Sink |
|---|---|
| −1.0 | .063286197 |
| − .8 | .051822262 |
| − .5 | .03342946 |
| 0 | 0 |
| + .5 | −.03633189 |
| + .8 | −.059374627 |
| +1.0 | −.07520072 |

Figure 7:
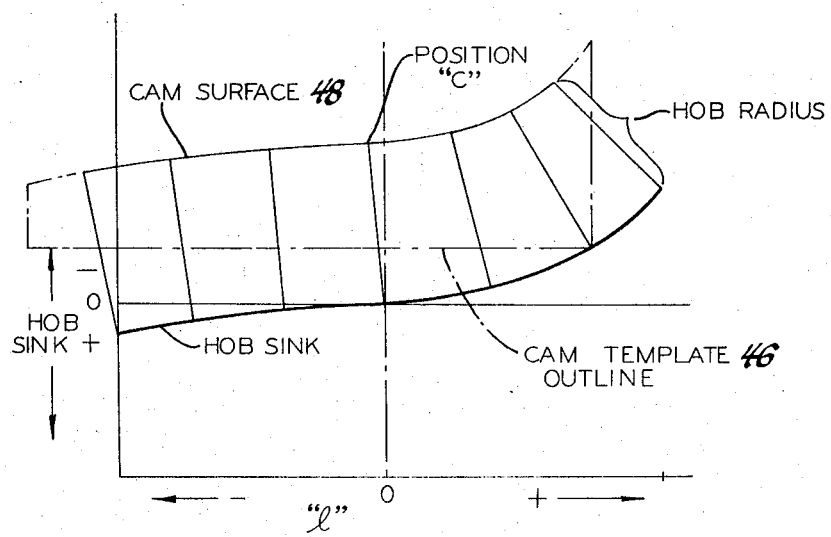
FIG. 7 is an enlarged view illustrating the formation of a portion of the FIG. 6 structure.

Also shown in FIG. 7 is the basic construction of the hob cam surface. A hob size, that is a hob of some radius, is selected, and then lines equal in length to the hob radius are constructed perpendicularly to the curve of Hob-Sink versus l. The end points of these perpendicular lines form the cam surface required to produce the arc tooth thickness on the shaft which matches the arc space width generating in the hub. It is apparent that these perpendicular lines may be constructed graphically as depicted in FIG. 7 or the end points may be determined mathematically by conventional plane geometry methods. With either method it is apparent that the cam surface 48 resulting from plotting these points is nonlinear and would conform to the curve represented generally in FIG. 7.

It may be noted that the overall length of the template 46 is such that the stylus 68 (FIG. 6) will not slip off the upper or lower edges of the cam template 46 during the actual formation of the grooves along the tapered shaft portion 38.

Thus, it is apparent that, as the hob slide assembly 58 traverses vertically along the stanchion 60, both the stanchion 60 and the slide assembly 58, with the rotatably attached hob 44, are caused to move laterally as a result of the stylus 68 following the cam surface 48, producing teeth on the tapered end 38 of the shaft 40 which match the respective space widths formed on the inner tapered surface 30 of the hub 28 at all calculated points along the respective tapered lengths of the shaft 40 and the hub 28.

In summary, there results a matched surface tapered involute spline arrangement (FIG. 8) wherein there is virtually no backlash, accounting for the elimination of wear in the spline despite repeated reversals of rotational direction during operation of the spline. By referring to FIG. 9, which is illustrative of a longitudinal view showing the involute shapes at two locations along the axial length of either the finished hub or the finished shaft, similar, for example, to the involute curve portions illustrated in FIGS. 3 and 4, it may be noted that the depth of each groove at all points along the length thereof is substantially constant and that the involute shape varies along the length of the walls, the arc space width of the hub at any point being the same as the respective arc tooth thickness of the shaft at such point, as indicated above.

As an alternate approach, the above-described step 5 may be broken down into two steps, as follows:

5a. Determine the arc space width on the hub at the axial position A, i.e., at +0.5 inch from reference position C, and considering the taper angle α.

$ASW_{A_1}$ = 2 $(R_{SH} + a \tan\alpha)[(ATT_{RGC}/2RGH) + $ Inv $\phi_{GC}$ − Inv $\phi_S]$ where $ASW_{A_1}$ = arc space width on the hub at position A
$2R_{SH}$ = standard pitch cylinder diameter, or (No. teeth on hub/DP) = (56/16) = 3.50
$RGH$ = hub generated radius, or $(56/16) \times RGC$ = $3.5 \times 0.51398528 = 1.79894848$
Inv $\phi_S$ = involute of the pressure angle at $R_{SH}$, $\phi_S$, where $\cos \phi_S = (R_{SH} \cos \phi_{SH})/(R_{SH} + a \tan \alpha)$, the standard pressure angle $\phi_{SH}$ being 30° for the example being calculated.

Specifically, $\cos \phi_S$ = $(1.750 \times \cos 30°/1.750 + 0.03496340)$ =
$(1.750 \times 0.8660254/1.78496340)$
= 0.84906191

∴ $\phi_S$ = 31.89021581°, and the value of Inv $\phi_S$ is obtainable from tables as 0.06561900. (See above referenced Manual of Gear Design, Section One, page 115.)

Substituting, $ASW_{A_1} = 2(1.750 + 0.03496340)[(0.08365999/2 \times 1.79894848) + 0.07054260 - 0.06561900]$
$= .1005864.$ 5b. Determine the arc space width on the hub but at the axial position A, $ASW_{A_2}$, at the standard pitch radius of 1.750.

$ASW_{A_2} = 2R_{SH}\{[ASW_{A_1}/2(R_{SH} + a \tan \alpha)] + \text{Inv } \phi_S - \text{Inv } \phi_{SC}\}$ Substituting, $ASW_{A_2} = 2 \times 1.750 [(0.10058647/2 \times 1.78496340) + 0.06561900 - 0.05375149]$
$= 0.14015246$ The cam surface 48 (FIG. 10) of the cam template 46 may be formed to generate a spline on the tapered end 38 of the shaft 40 which substantially conforms to the spline formed on the surface 30 of the hub 28, in the following manner.

First, a reference position C is selected, comparable to the above-mentioned reference position C but corrected by a distance R which is equal to the sine $\alpha$ (in this instance, 4°) x the radius of the standard hob 44, say, 1.204, or, in the instant example, 0.07092 × 1.204, or 0.08397. This relates the hob's perpendicular contact with the tapered portion 38 of the shaft 40 to the point contact between the stylus 68 and the cam surface 48 of the template 46. The increments $a$, the same as described above, are then employed to determine various axial positions A with respect to the reference position C, corresponding to the above axial positions A with respect to the reference position C. Next, the so-called hob-sink is determined with respect to a standard pitch cylinder through the reference position C. The formula for such hob-sink is:

$\text{hob-sink}_{A'} = [(ATT_{SC} - ATT_S)/(2 \times \tan \phi_{SC})]$ where $\phi_{SC}$ is the 30° PA selected above, $ATT_{SC}$ and $ATT_S$ are determined above, the latter, arc tooth thickness of the shaft 40, being the same as $ASW_{A_2}$, and wherein hob-sink$_{A'}$ is the amount that the center distance varies between the shaft 40 and the hob 44 at any location A' (FIG. 7) as a result of the hob 44 following the cam surface 48, a minus value indicating an increase in the center distance, occurring to the right of the reference plane C in FIG. 8.

Substituting the values determined for a particular location A' (where $a$ is +0.5 inch):

$\text{hob-sink}_{A'} = [(0.09817477 - 0.14015246/2 \times 0.57735027)]$
$= -0.03633189$ Now, the hob-sink normal to the selected position A' is:

$\text{hob-sink}_{A'} = \text{hob-sink}_{A'} \times \cos 4°$
$= -0.03633189 \times 0.99756405$
$= -0.03624339$ If the hob-sink$_{A'}$ is now determined for various other points along the length of the spline, for example, +1, 0, −0.5, and −1, the respective results are −0.0750, 0, +0.0333, and +0.0631. Thus it is apparent that the cam surface 48 resulting from plotting these points is nonlinear and would conform to the curve represented generally in FIG. 5.

While a substantial number of forms are used in the generation of gear-teeth profiles, for example, cycloidal, elliptoidal, etc., the procedures employed above in the production of full-length matching teeth shapes on tapered spline members have been related to the gear-tooth profile most commonly used today, i.e., the involute curve.

While but one embodiment of the inventive apparatus and two mathematical techniques for determining suitable tooling components for producing same have been shown and described, other modifications, such as the employment of different machine tools than those mentioned above, and other approaches, such as a graphical technique for determining the requisite tooling components, are possible.

We claim:

1. A method of manufacturing tapered involute splines on an internally tapered hub workpiece and on an externally tapered shaft workpiece for assuring a substantially perfectly matching interfit, said method comprising the following steps:

a. mounting the generating head of a standard gear shaper on the base thereof at an angle conforming to the taper of said hub workpiece;

b. securing said hub workpiece on the work support table on said gear shaper base;

c. generating longitudinal involute formed spaces along the internal surface of said hub workpiece with a standard cutter reciprocally mounted on said tilted gear shaper head, so as to produce oppositely disposed involute wall surfaces at all points along the progressively varying circumference of said internally tapered hub workpiece;

d. removing the finished hub from said work support table;

e. shaping a cam surface along a cam template for use on a standard crown-type hobbing machine, said cam surface at any predetermined number of selectively spaced points therealong being reflective of the width of said spaces of said finished hub intermediate said oppositely disposed involute wall surfaces thereof at said predetermined number of corresponding selectively spaced points along the length of said finished hub;

f. securing said shaft workpiece on a rotatable table of said hobbing machine;

g. mounting said cam template on said hobbing machine with said predetermined cam surface synchronized with the axial location of the tapered portion of said shaft workpiece;

h. generating the involute profiles of the external teeth on said tapered portion of said shaft workpiece with a standard hob rotatably mounted on said hobbing machine and following said cam surface, so as to produce teeth with oppositely disposed involute wall surfaces identical to said involute wall surfaces formed on said hub workpiece; and i. removing the finished shaft from said rotatable table.

2. A method of manufacturing matching involute splines on an internally tapered hub workpiece and on an externally tapered shaft workpiece, said method comprising the following steps:

a. generating involute formed grooves on the inner surface of said internally tapered hub workpiece with a cutter mounted so as to travel along a linear path at an angle equal to the degree of taper of said internally tapered surface, said grooves having oppositely disposed involute wall surfaces formed along the progressively varying circumference of said internally tapered surface; and b. shaping a template having a cam surface formed thereon for use on a standard crown-type hobbing machine to generate involute crown profiled teeth on the outer surface of said externally tapered shaft workpiece, said cam template having a specially shaped cam surface formed thereon for causing said teeth to have oppositely disposed involute wall surfaces formed along the progressively varying circumference of said externally tapered surface exactly conforming to said oppositely disposed involute wall surfaces of said grooves along the full axial length thereof, wherein the arc tooth thicknesses at any predetermined number of selected points along said tapered surface of said shaft correspond to the arc space widths between teeth at said predetermined number of corresponding selected points along said tapered surface of said hub;

c. mounting said cam template on said hobbing machine with said cam surface synchronized with the axial location of the tapered portion of said shaft workpiece and d. generating involute profiled teeth on the outer surface of said externally tapered shaft workpiece with a hob mounted so as to travel along a predetermined non-linear path as determined by said cam template.

3. The method described in claim 2, wherein said arc tooth thicknesses result from hob-sink at said selected points along said tapered surface of said shaft conforming to the following formula:

Hob-sink = $[(ASW_{CRSH} - ASW_{ARSH})/(2 \times \tan \phi_{SC})]$ where $ASW_{CRSH}$ = the arc space width on the hub at a reference position, or the arc tooth thickness on the cutter at known cutter pitch diameter;

$ASW_{ARSH}$ = the arc space width on the hub at a selected axial position; and

Tan $\phi_{SC}$ = tangent of the standard pressure angle; with $ASW_{ARSH}$ conforming to the following formula:

$ASW_{ARSH} = 2R_{SH} [ASW_{RGH}/2(RGH)] \times \text{Inv } \phi_{GC} - \text{Inv } \phi_{SC}$ where $2R_{SH}$ = standard pitch cylinder diameter or No. teeth on hub ÷ diametral pitch, DP;

$ASW_{RGH}$ = the arc space width on the hub at the generated radius on the hub, RGH, which is the same as the arc tooth thickness at the cutter generating radius, RGC;

Inv $\phi_{GC}$ = involute of the pressure angle, $\phi_{GC}$, at RGC; and

Inv $\phi_{SC}$ = involute of the selected pressure angle at $R_{SC}$ where $2R_{SC}$ = cutter pitch circle diameter;

with the arc tooth thickness at RGC conforming to the following formula:

$ATT_{RGC} = 2RGC [ATT_{SC}/2R_{SC}] + \text{Inv } \phi_{SC} - \text{Inv } \phi_{GC}$ where $ATT_{SC}$ = the arc tooth thickness on the cutter at $2R_{SC}$ and RGC conforming to the following formula:

$RGC = [(CD_A + BCR_C)/(BCR_H - BCR_C)]$ where $CD_A$ = the center distance at the selected axial position;

$BCR_C$ = the cutter base circle radius, or (No. teeth on cutter/2DP) × cosine of the selected pressure angle, PA; and $BCR_H$ = the hub base circle radius, or (No. teeth on hub/2DP) × cosine PA;

with $CD_A$ conforming to the following formula:

$CD_A = CD_{STD} + 1 \tan\alpha$ where $CD_{STD}$ = the standard center distance, or (No. teeth on hub − No. teeth on cutter)/2DP 1 = any selected length away from the reference position; and $\alpha$ = the angle of the cutter tilt.

* * * * *

UNITED STATES PATENT OFFICE
CERTIFICATE OF CORRECTION

PATENT NO. : 3,862,585
DATED : January 28, 1975
INVENTOR(S) : Kenneth B. Harmon; George L. Bowers; William G. Livezey It is certified that error appears in the above-identified patent and that said Letters Patent are hereby corrected as shown below:

Column 2, line 5, "basee" should read -- base --;
　　　　　　line 59, before "diam-" insert -- pitch --;
　　　　　　line 63, "L" should read -- 1 --.

Column 3, line 7, before "1.25", the plus sign "+" should be -- = --;
　　　　　　line 31, "2.16" should read -- 2·16 --;
　　　　　　line 32 (both occurrences), "2.16" should read -- 2·16 --;
　　　　　　line 51, the plus sign "+" should be -- = --;
　　　　　　line 57, the plus sign "+" should be -- = --;
　　　　　　line 60, "RGC" (italicized) should be unitalicized, solid caps.

Column 6, line 4, "generating" should read -- generated --.

Column 7, line 21, C should be -- C' --;
　　　　　　line 31, A should be -- A' --;
　　　　　　line 32, C should be -- C' --;
　　　　　　line 36, C should be -- C' --;
　　　　　　line 46, C should be -- C' --.

Column 10, line 3, the times sign "x" should be -- + --.

Signed and Sealed this second Day of September 1975

[SEAL]

Attest:

RUTH C. MASON
Attesting Officer

C. MARSHALL DANN
Commissioner of Patents and Trademarks